United States Patent [19]
Carmichael

[11] 3,806,614
[45] Apr. 23, 1974

[54] EXTRUSION APPARATUS IMPROVED BY INCORPORATING A POLYMER CHOKE

[75] Inventor: Keith Stewart Carmichael, Wilmington, Del.

[73] Assignee: E. I. du Pont de Nemours and Company, Wilmington, Del.

[22] Filed: July 14, 1972

[21] Appl. No.: 271,939

[52] U.S. Cl. .................. 425/326 B, 425/DIG. 206
[51] Int. Cl. ............................................ B29d 23/03
[58] Field of Search .......... 425/DIG. 203, DIG. 206, 425/249, 242 B, 326, 326 B, 387 B

[56] References Cited
UNITED STATES PATENTS
| | | | |
|---|---|---|---|
| 2,706,308 | 4/1955 | Lorenz | 425/326 B |
| 3,160,130 | 12/1964 | Pesak | 425/387 B |
| 3,288,898 | 11/1966 | West | 425/326 B |
| 3,461,503 | 8/1969 | Dockery | 425/292 |

Primary Examiner—Richard B. Lazarus

[57] ABSTRACT

In producing a thermoplastic bottle by extruding a thermoplastic slug at its molecular orientation temperature through an annular orifice into a sliding mold forming the cappable portion of the bottle and thereafter simultaneously continuing to extrude while drawing and blowing the extrudate to force it to conform to the mold, the improvement comprising maintaining the extruded thermoplastic in the cappable portion of the bottle during the formation of the cappable portion of the bottle by an annular constricted area that forms a polymer choke located immediately below that portion of the mold which forms the cappable portion of the bottle.

5 Claims, 7 Drawing Figures

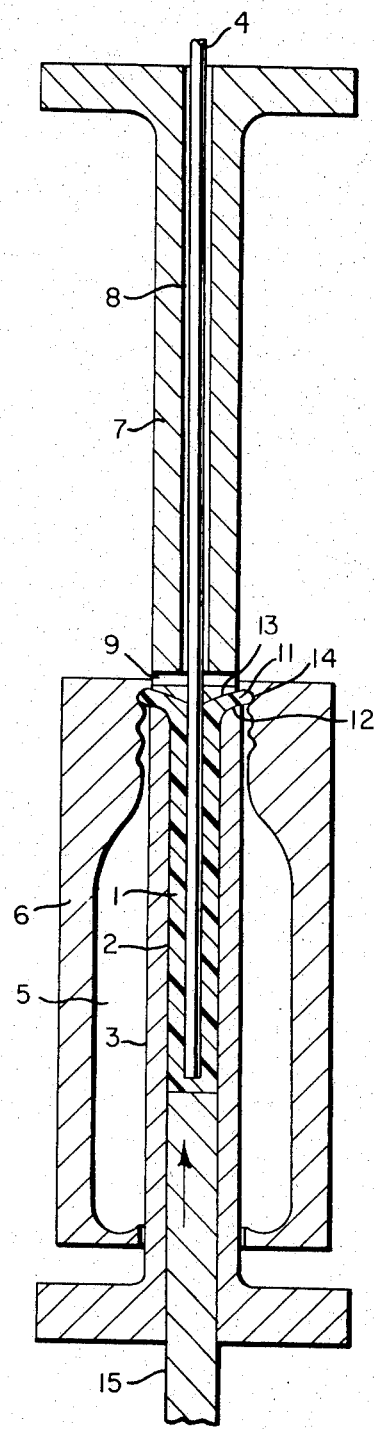
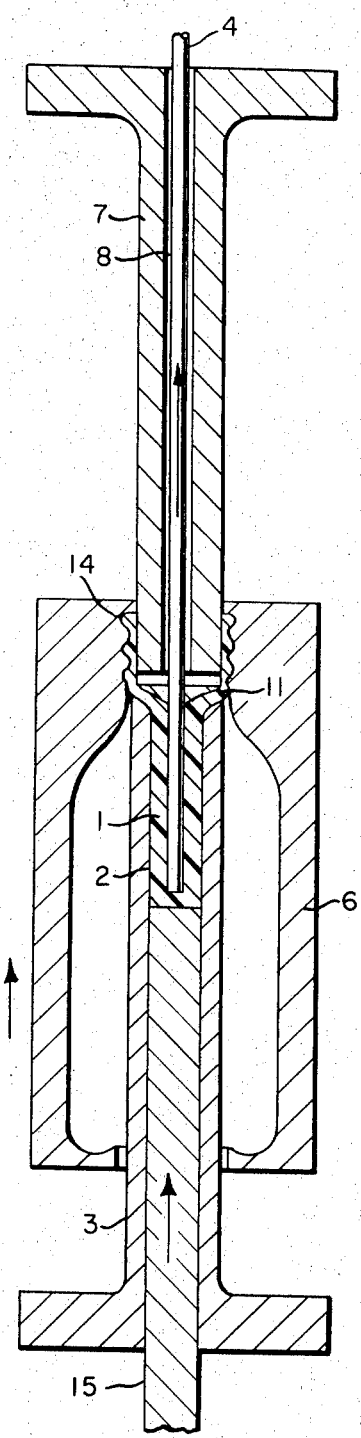
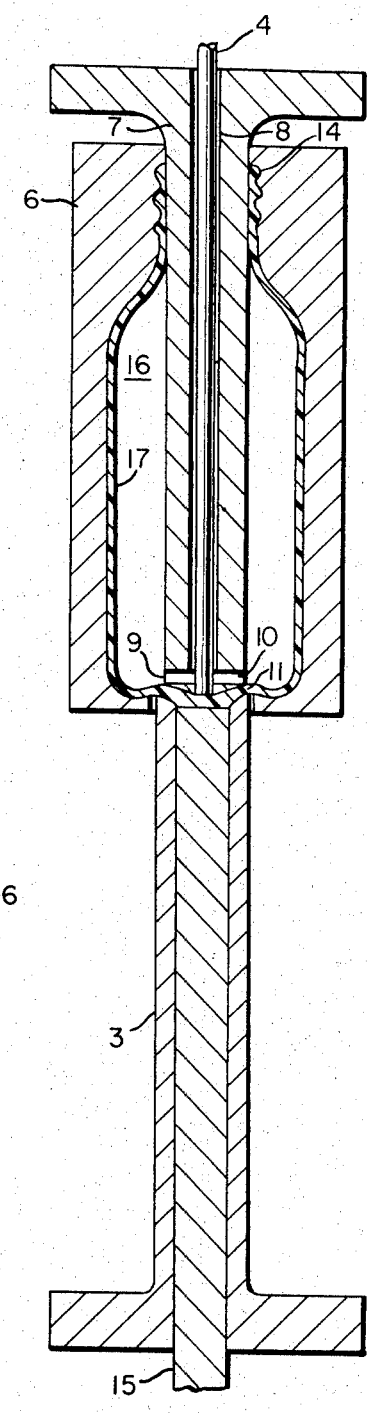

3,806,614

EXTRUSION APPARATUS IMPROVED BY INCORPORATING A POLYMER CHOKE

BACKGROUND OF THE INVENTION

This invention relates to an improvement in a process and apparatus for extruding thermoplastic containers useful in bottling liquids under pressure such as beverage bottles.

U. S. Pat. application Ser. No. 262,594, filed June 14, 1972 and assigned to the assignee of this application, discloses and claims a process for forming a generally cylindrical, molecularly oriented, thermoplastic container such as a bottle useful in bottling liquids under pressure. U. S. Pat. application Ser. No. 262,593, filed June 14, 1972 and assigned to the assignee of this application, discloses and claims an apparatus for forming such bottles. The process is carried out by executing the steps comprising:

a. extruding a hollow thermoplastic slug through an annular extrusion orifice into a sliding mold wherein the leading portion of the extruded slug at its molecular orientation temperature is forced into a holding recess in the mold forming the cappable portion of the bottle, then, while continuing the extrusion of the slug, simultaneously b. drawing the extrudate by sliding the mold past the extrusion orifice, and c. expanding the extrudate by forcing a fluid against the interior walls of the extrudate forcing the extrudate to expand to the shape of the mold.

Orienting the thermoplastic polymer in the axial direction (as opposed to the hoop direction) is primarily accomplished by drawing the extrudate as the hollow slug To extruded. to accomplish this, the first portion of the hollow slug extruded which flows into the top of the mold forming the top capping portion of the bottle acts as the anchor or holding point from which the extrudate is drawn. Therefore, there is always a force trying to pull or draw the thermoplastic out of the top of the mold. Since the extrudate is hot because it is worked during the extrusion step, it usually does not have sufficient strength to stay in place in the top of the mold while it is being drawn. As a result, the cap portion of the finished bottle may be irregular making it difficult to seal the contents of the bottle with a cap.

In addition, polymer first extruded into the cappable portion of the bottle mold is extruded under relatively high extrusion pressures. The high pressure is needed to force the polymer into all the recesses forming the cappable portion of the bottle, such as the threads in the threaded section of a bottle used to accommodate a screw on-type cap. The extrudate, however, under such relatively high extrusion pressures may be diverted before all of the recesses in the cappable portion of the bottle mold are full and begin to exude into the neck portion of the mold (immediately below the cappable portion of the bottle) prematurely. Then, when the sliding mold does move past the extrusion orifice which is continuously extruding polymer, the newly extruded polymer will fold over the backed-up polymer that escaped from the cappable portion of the bottle and forms a polymer defect such as a buckle or wrinkle. This is undesirable because the recesses in the mold of the cappable portion of the bottle do not get completely formed and the neck of the bottle shows a polymer defect and ensuing weakness.

Therefore, it is desirable to find a way of improving the above-identified process of forming a thermoplastic bottle to consistently insure a high yield of bottles having a top that can be sealed by capping and a neck without a polymer defect.

SUMMARY OF THE INVENTION

Accordingly, the present invention provides a process and apparatus for improving the form of the neck and the cappable portion of a thermoplastic bottle. The process of this invention is described as follows: In a process of producing a thermoplastic bottle comprising:

a. extruding a hollow thermoplastic slug through an annular extrusion orifice into a sliding mold wherein the leading portion of the extruded slug at its molecular orientation temperature is extruded into a holding recess in the mold forming the cappable portion of the bottle, then, while continuing the extrusion of the slug, simultaneously b. drawing the extrudate by sliding the mold past the extrusion orifice, and c. expanding the extrudate by forcing a fluid against the interior walls of the extrudate forcing the extrudate to expand to the shape of the mold, the improvement comprising maintaining the extruded thermoplastic in the cappable portion of the bottle during the formation of the cappable portion of the bottle by an annular constricted area that forms a polymer choke located immediately below that portion of the mold which forms the cappable portion of the bottle. Since the slug is extruded cold, i.e., slug is below its melting temperature, relatively high extrusion pressures are necessary to effectuate extrusion and properly form the cappable portion of the bottle. This polymer choke now permits these increased extrusion pressures to be used to insure excellent mold conformation without the problem of forcing the polymer out of that portion of the mold which forms the cappable portion of the bottle.

BRIEF DESCRIPTION OF THE DRAWINGS

FIG. 1 shows a cross section of apparatus useful in carrying out the process of the present invention with the sliding mold in a position to begin the process of making a bottle.

FIG. 2 shows the apparatus of FIG. 1 with the sliding mold stopped after the cappable portion of the bottle has been formed permitting the polymer in the cappable portion to become form stable.

FIG. 3 shows the apparatus of FIG. 1 with the sliding mold in the position where the bottle is completely made.

DETAILS OF THE INVENTION

Figure 4:
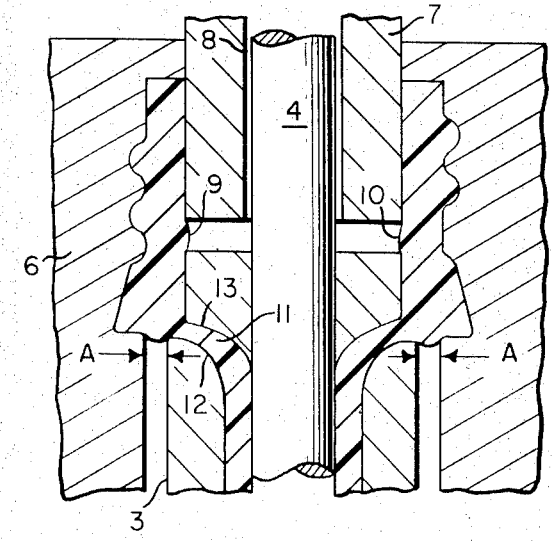
FIG. 4 shows an enlarged cross section of a mold and extrusion orifice stopped in their respective positions after the cappable portion of a bottle has been formed.

The present invention is an improvement in the process disclosed and claimed in U.S. Pat. application Ser. No. 262,594, filed June 14, 1972, carried out with the use of the apparatus disclosed and claimed in U. S. Ser. No. 262,593, June 14, 1972, wherein each above-identified application is hereby incorporated by reference.

The improved apparatus useful in carrying out the improved process of this invention will be described with the aid of the drawings. Referring to FIGS. 1 to 3, a hollow, cylindrically shaped, thermoplastic polymer slug 1 having one end open and one end closed is placed in extrusion chamber 2 formed by the bore of an extrusion barrel 3 and the outside cylindrical surface of a center supporting rod 4. A mold cavity 5 of mold 6 has an internal configuration such as the shape of the article desired and is positioned in a first location surrounding the extrusion barrel 3 as is particularly shown in FIG. 1. The mold cavity 5 illustrated in FIG. 1 is one for use in fabricating a narrow-neck bottle that can be employed in bottling carbonated beverages.

The mold can be designed having many different configurations and even the top portion of the bottle, meaning that portion of the bottle used for capping, can be designed to accommodate various types of bottle caps. Some conventional caps include crown caps usually requiring only a single bead around the opening in the bottle in order to secure the cap to the bottle or pilfer-proof caps usually requiring a threaded section near the top and a shoulder or band portion that assists in anchoring the cap to the bottle. The bottle and cap should be so designed that the cap is capable of sealing the contents in the bottle.

The extrusion barrel 3 is in axial alignment with a mandrel 7 having a uniform outside diameter that is substantially the same as the inside diameter of the neck of the bottle being fabricated. A fluid passage 8 is contained within the mandrel 7 having fluid exit ports 9 and 10 at the end of the mandrel 7 that is in closest proximity to the extrusion barrel 3. Situated between the end of the barrel 3 and the end of the mandrel 7 is an annular extrusion orifice 11. This orifice can conveniently be formed by rounded end 12 of the extrusion barrel 3 and annular flared piece 13 which is attached to the body of the mandrel 7.

The annular extrusion orifice 11 is defined by the confronting end portions 12 of the extrusion barrel 3 and the rounded end 13 of the mandrel 7. In cross-sectional profile, wherein the cross section is taken coplanar with the central axis of extrusion, both members are machined with a curving shape to provide a smooth transition from the annular extrusion chamber 2 outwardly and to provide a boundary for the annular extrusion orifice 11 such that the extrusion gap is convergent.

The orifice serves as the locus for high rate work input to the polymer that raises the temperature of the polymer to the orientation temperature range of the polymer, insuring good orientation characteristics. In general, the degree of orientation of the extrudate increases as the ratio increases between the average diameter of the extrudate as it emerges from orifice 11 and the average diameter of the slug. The annular extrusion orifice 11 is area-convergent, as shown, in order to insure stable flow and a finite pressure drop between chamber 2 and the outer part of the orifice 11 during extrusion.

In operation, the apparatus is used in the following manner: The thermoplastic polymeric slug 1 at room temperature or, optionally, warmed by preheating to a temperature below its melting temperature is placed within the extrusion chamber 2. Extrusion ram 15 is activated and it pushes on the blind end of the slug forcing the open end of slug 1 through the annular extrusion orifice 11 and into mold cavity 5. The first part of the slug 1 to leave the annular extrusion orifice 11 and enter the mold at 14 fills the entire upper part of the annular space between the outside of the mandrel 7 and the inside of the mold 6 thereby effecting a seal to contain the blowing fluid. This is shown in FIG. 1.

Since the top of the bottle is used to accommodate a cap, the bottle will have a bead or threads around the top portion of the bottle to accept the cap. The bead or threads are formed by providing appropriate recesses in the mold. When polymer is extruded into these recesses and thereafter drawn, the polymer in the recesses aids in anchoring and gripping the polymer to keep it from withdrawing out of the top portion of the bottle.

The extrusion step is initiated alone with the extrusion pressure being great enough to force polymer into the mold and move the mold a sufficient distance to permit the cappable portion of the bottle to be formed. Thereafter, the mold is positively driven at a rate sufficient to draw the polymer, and blowing is initiated. During the initial extrusion, the mold can be restrained in its motion by hydraulic cylinders or springs in order to permit the extrusion pressure to build up to aid in forcing the extrudate into the mold recesses such as those required to form a cappable top.

At this point in the process sequence, the mold drive means has not been activated nor has the blowing step been initiated.

Immediately after the completion of the formation of the cappable portion of the bottle including a bead or threads within the mold cavity 5, the mold 6 and ram 15 are positively driven at appropriate and relative rates sufficient to draw the polymer. A fluid, such as compressed air, or liquid including the liquid being packaged is forced through the fluid passage 8, out of the fluid exit ports 9 and 10 and into cavity 16. This cavity is formed by the external surface of the mandrel 7, the extruded seal at the annular groove 14 and the extrudate 17.

FIG. 3 illustrates the bottle in the mold at the end of the extruding, drawing, and expanding steps.

An annular constructed area is provided between the interior of the mold and the extrusion orifice at a position immediately below the threaded neck. The constriction should be small enough to act as a choke, preventing extruded polymer from exuding out of the neck portion of the mold.

The annular constricted area can be formed in one of several ways. Referring to the drawings, FIG. 4-7 show an enlarged cross section of a mold and extrusion orifice stopped at their respective positions after the cappable portion of the bottle has been formed. For discussion in relative terms, the dimension between the interior surface of the mold and the extrusion barrel identified by an "A" in FIG. 4 represents an acceptable standard clearance.

Figure 5:
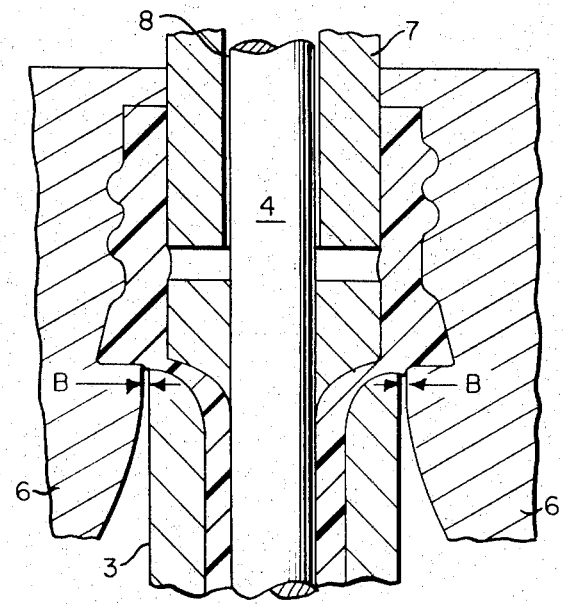
FIG. 5 shows an enlarged cross section of a mold and extrusion orifice stopped in their respective positions after the cappable portion of a bottle has been formed with the additional feature of an annular constricted area immediately below the threaded portion formed by decreasing the size of the mold to form the constricted area.

In FIG. 5, the mold is made smaller in the area immediately below the cappable portion of the bottle, whereas the extrusion barrel size remains the same. Therefore, the clearance between the mold and the extrusion barrel identified as "B" is relatively smaller than "A" clearance, thereby providing a choke to keep the extruded polymer from exuding into the neck portion of the bottle. This results in at least two advantages. First, it stabilizes the polymer flow, that is, the polymer in the neck cools and becomes form stable faster and with greater conformity to the mold. Secondly, by making the neck area a sealed cavity, a higher extrusion pressure can be used improving polymer conformation in the mold.

The following is an example of the degree of choking clearance used in the manufacture of a soda bottle that will hold about 10 fluid ounces. The original clearance which was an acceptable standard clearance between the mold and the extrusion barrel was about 0.035 inch. An effective polymer choke has been formed by reducing this clearance to 0.005 inch maximum.

Figure 6:
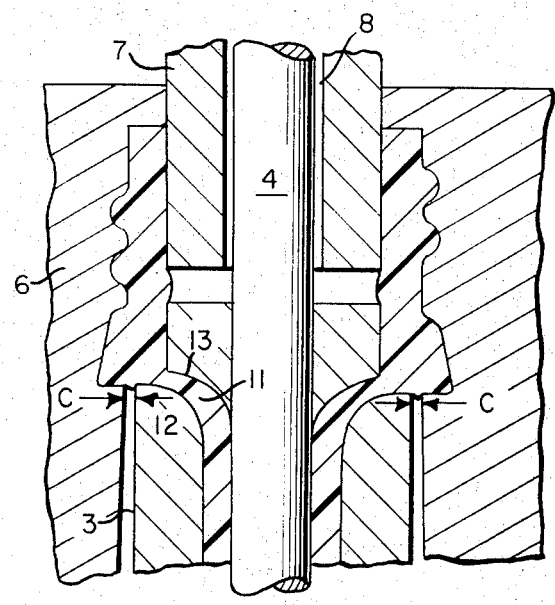
FIG. 6 shows an enlarged cross section of a mold and extrusion orifice stopped in their respective positions after the cappable portion of the bottle has been formed with the additional feature of an annular constricted area immediately below the threaded portion formed by increasing the size of the extrusion barrel while keeping the mold dimensions constant.

In FIG. 6, the constructed area immediately below the neck portion of the bottle is formed by keeping the mold size constant but increasing the extrusion barrel size. The clearance dimension is shown as "C." This embodiment has the advantage of providing an exceptionally strong extrusion barrel improving the durability of the apparatus along with permitting the use of slugs having a relatively thicker shell. Accordingly, this is the preferred embodiment.

Figure 7:
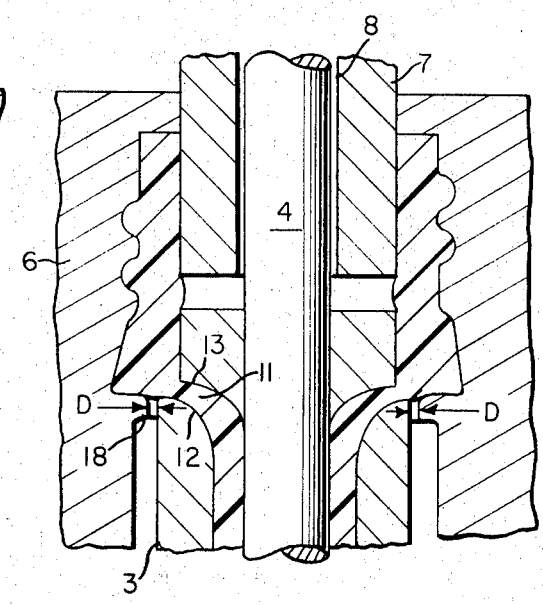
FIG. 7 shows an enlarged cross section of a mold and extrusion orifice stopped in their respective positions after the cappable portion of the bottle has been formed with the additional feature of an annular constricted area immediately below the threaded portion formed by an annular mold protrusion.

In FIG. 7, the constricted area is formed by an annular mold protrusion 18. The protrusion is in the interior of the mold. The clearance dimension is shown as "D." The resulting indentation left in the bottle provides a suitable space to tuck in a pilfer-proof type cap.

While three embodiments are shown depicting ways of obtaining a constricted area to act as a polymer choke, one skilled in the art, knowing the present invention and the reasons for its use, could devise other ways to effect a constriction as useful as those disclosed.

After the neck portion of the bottle is formed, the extrusion step continues as the slug continues to be extruded through the annular extrusion orifice 11 by the extrusion ram 15 while the drawing and blowing steps are initiated wherein mold 6 moves toward the location over the mandrel 7 as shown in FIG. 3. The combined action of the extrusion of the slug 1 and the expansion of the extrudate results in the desired shape of the bottle article 17 shown in FIG. 3. This bottle is in a highly biaxially oriented state.

The thermoplastic article produced can have a uniform or a nonuniform shell thickness depending on relative motion between the extrusion orifice, the ram and the mold. When they are held constant and are used with a mold having a varying shape, the shell thickness will be nonuniform. It is well known, however, that shell thickness can be controlled by properly programming the apparatus to obtain either a uniform or a nonuniform thickness as desired.

The thermoplastic polymeric material of the slug 1 that is extruded through the annular extrusion orifice 11 becomes partially biaxially oriented from the extrusion operation. The remainder of the desired biaxial orientation of the extruded shape 17 is accomplished as the extrudate is drawn and expanded against the surface of the mold cavity 5 contained within the mold 6. There is a substantial decrease, e.g., up to 50% or more, in wall thickness of the extrudate after it has been drawn and expanded.

Various types of thermoplastics are useful in the present invention. Useful thermoplastic materials include copolymers of acrylonitrile/styrene/acrylate, acrylonitrile/methacrylate; methacrylonitrile copolymers; polycarbonates; polybis(para-aminocyclohexyl) dodecaneamide and other polyamides; polyformaldehyde; polyolefins such as high-density polyethylene and polypropylene; polyesters and polyvinyl chloride.

The preferred thermoplastic material is polyethylene terephthalate, and copolymer blends thereof. One reason polyethylene terephthalate is preferred is because, when molecularly oriented, it exhibits excellent strength, creep resistance, and a low permeation factor, particularly with respect to carbon dioxide, oxygen and water vapor, making it excellently suited for use as a container for liquids bottled under pressure, such as sodas, beer, or aerosols.

I claim:

1. In an apparatus for producing a thermoplastic bottle comprising:
   a. means for extruding a hollow thermoplastic slug from an extrusion barrel through an annular extrusion orifice into a mold wherein there is relative motion between the extrusion orifice and the mold and wherein the leading portion of the extruded slug at its molecular orientation temperature flows into a holding recess in the mold forming the cappable portion of the bottle, then, while continuing extrusion of the slug, simultaneous
   b. means for drawing the extrudate by sliding movement between the mold and the extrusion orifice and
   c. means for expanding the extrudate by forcing a fluid against the interior walls of the extrudate forcing the extrudate to expand to the shape of the mold, the improvement comprising means for forming an annular constricted area of about 0.005 inch maximum clearance, between the interior of the mold and the extrusion barrel, located immediately below that portion of the mold which forms the cappable portion of the bottle, whereby the relative movement between the orifice and mold forms a choke at one location that keeps the extrudate in that portion of the mold that forms the cappable portion of the bottle during the formation of that portion of the bottle.

2. The apparatus of claim 1 wherein the annular constriction is formed by increasing the size of the extrusion barrel.

3. The apparatus of claim 1 wherein the annular constriction is formed by decreasing the size of the mold.

4. The apparatus of claim 1 wherein the annular constriction is formed by an annular protrusion from the interior wall of the mold.

5. Apparatus of claim 1 wherein the annular extrusion orifice is stationary and the mold slides relative to said annular extrusion orifice.

* * * * *